United States Patent
Vetters et al.

(10) Patent No.: US 10,012,100 B2
(45) Date of Patent: Jul. 3, 2018

(54) TURBINE SHROUD WITH TUBULAR RUNNER-LOCATING INSERTS

(71) Applicants: Rolls-Royce Corporation, Indianapolis, IN (US); Rolls-Royce North American Technologies, Inc., Indianapolis, IN (US)

(72) Inventors: Daniel K. Vetters, Indianapolis, IN (US); Jun Shi, Carmel, IN (US); Jeffrey A. Walston, Indianapolis, IN (US); Aaron D. Sippel, Zionsville, IN (US)

(73) Assignees: Rolls-Royce North American Technologies Inc., Indianapolis, IN (US); Rolls-Royce Corporation, Indianapolis, IN (US)

(*) Notice: Subject to any disclaimer, the term of this patent is extended or adjusted under 35 U.S.C. 154(b) by 364 days.

(21) Appl. No.: 14/989,263

(22) Filed: Jan. 6, 2016

(65) Prior Publication Data

US 2016/0208635 A1    Jul. 21, 2016

Related U.S. Application Data (60) Provisional application No. 62/103,818, filed on Jan. 15, 2015.

(51) Int. Cl.
*F01D 11/08* (2006.01)
*F01D 25/28* (2006.01)
(Continued)

(52) U.S. Cl.
CPC .............. *F01D 11/08* (2013.01); *F01D 11/12* (2013.01); *F01D 21/003* (2013.01); *F01D 25/28* (2013.01);
(Continued)

(58) Field of Classification Search
CPC .......... F01D 11/08; F01D 11/12; F01D 11/14; F01D 11/20; F01D 11/22; F01D 11/24;
(Continued)

(56) References Cited

U.S. PATENT DOCUMENTS 3,601,414 A    8/1971   Rao
4,087,199 A    5/1978   Hemsworth et al.
(Continued)

FOREIGN PATENT DOCUMENTS

DE    102008044450 A1    2/2009
EP        1965030 A2    9/2008
(Continued)

OTHER PUBLICATIONS

Blosser, Max L.and McWithey, Robert R.; Theoretical Basis for Design of Thermal-Stress-Free Fasteners; NASA Technical Paper; Dec. 1983; pp. 1-26.
(Continued)

*Primary Examiner* — Ninh H Nguyen
*Assistant Examiner* — Topaz L Elliott
(74) *Attorney, Agent, or Firm* — Barnes & Thornburg LLP (57) ABSTRACT

A turbine shroud for a gas turbine engine includes a carrier and a blade track. The blade track includes an annular runner and a plurality of inserts that extend radially outward away from the annular runner. The inserts extend through the carrier to couple the annular runner with the carrier.

20 Claims, 8 Drawing Sheets

(51) Int. Cl.
*F01D 21/00* (2006.01)
*F01D 11/12* (2006.01)

(52) U.S. Cl.
CPC .... *F05D 2220/32* (2013.01); *F05D 2230/642* (2013.01); *F05D 2250/291* (2013.01); *F05D 2260/30* (2013.01); *F05D 2300/2261* (2013.01); *F05D 2300/6033* (2013.01); *F05D 2300/6034* (2013.01); *Y02T 50/672* (2013.01)

(58) Field of Classification Search
CPC ............... F01D 25/28; F01D 21/003; F05D 2300/2261; F05D 2300/6033; F05D 2230/642; F05D 2260/30; F04D 29/563
See application file for complete search history.

(56) References Cited

U.S. PATENT DOCUMENTS

| | | | |
|---|---|---|---|
| 4,477,086 A | 10/1984 | Feder et al. | |
| 4,646,810 A | 3/1987 | Lardellier | |
| 4,679,981 A | 7/1987 | Guibert et al. | |
| 4,863,345 A | 9/1989 | Thompson et al. | |
| 5,163,809 A | 11/1992 | Akgun et al. | |
| 5,738,490 A | 4/1998 | Pizzi | |
| 6,142,731 A | 11/2000 | Dewis et al. | |
| 6,315,519 B1 | 11/2001 | Bagepalli et al. | |
| 6,517,313 B2 | 2/2003 | Rogers | |
| 6,726,448 B2 | 4/2004 | McGrath et al. | |
| 6,733,233 B2 | 5/2004 | Jasklowski et al. | |
| 6,758,386 B2 | 7/2004 | Marshall et al. | |
| 6,758,653 B2 | 7/2004 | Morrison | |
| 6,896,483 B2 | 5/2005 | Dierksmeier et al. | |
| 6,910,853 B2 | 6/2005 | Carman et al. | |
| 7,011,493 B2* | 3/2006 | Marchi | F01D 9/04 415/116 |
| 7,044,709 B2* | 5/2006 | Bruce | F01D 9/04 415/135 |
| 7,090,459 B2 | 8/2006 | Bhate et al. | |
| 7,195,452 B2 | 3/2007 | Allan et al. | |
| 7,217,089 B2 | 5/2007 | Durocher et al. | |
| 7,234,306 B2 | 6/2007 | Aumont et al. | |
| 7,374,396 B2 | 5/2008 | Martin et al. | |
| 7,435,049 B2 | 10/2008 | Ghasripoor et al. | |
| 7,575,409 B2* | 8/2009 | Dierksmeier | F01D 11/22 415/1 |
| 7,641,442 B2 | 1/2010 | Denece et al. | |
| 7,665,960 B2 | 2/2010 | Shi et al. | |
| 7,771,160 B2 | 8/2010 | Shi et al. | |
| 7,914,256 B2 | 3/2011 | Xie et al. | |
| 7,988,395 B2 | 8/2011 | Steffier | |
| 8,047,773 B2 | 11/2011 | Bruce et al. | |
| 8,061,977 B2 | 11/2011 | Keller et al. | |
| 8,079,807 B2 | 12/2011 | Shapiro et al. | |
| 8,092,160 B2 | 1/2012 | Shi et al. | |
| 8,167,546 B2 | 5/2012 | Shi et al. | |
| 8,235,670 B2 | 8/2012 | Morrison et al. | |
| 8,257,029 B2 | 9/2012 | Habarou et al. | |
| 8,322,983 B2 | 12/2012 | Marini | |
| 8,328,505 B2 | 12/2012 | Shi et al. | |
| 8,496,431 B2 | 7/2013 | Habarou et al. | |
| 8,511,975 B2 | 8/2013 | Shi et al. | |
| 8,555,647 B2 | 10/2013 | Dimascio et al. | |
| 8,568,091 B2 | 10/2013 | McCaffrey | |
| 8,651,497 B2 | 2/2014 | Tholen et al. | |
| 8,684,689 B2 | 4/2014 | Guo et al. | |
| 8,739,547 B2 | 6/2014 | Jarmon et al. | |
| 8,740,552 B2 | 6/2014 | Marusko et al. | |
| 8,770,931 B2 | 7/2014 | Alvanos et al. | |
| 8,784,052 B2 | 7/2014 | Shi et al. | |
| 8,790,067 B2 | 7/2014 | McCaffrey et al. | |
| 8,801,372 B2 | 8/2014 | Shi et al. | |
| 8,814,173 B2 | 8/2014 | Motzkus et al. | |
| 8,834,106 B2 | 9/2014 | Luczak | |
| 8,926,270 B2 | 1/2015 | Karafillis et al. | |
| 8,985,944 B2* | 3/2015 | Shapiro | F01D 9/04 415/173.1 |
| 9,011,079 B2 | 4/2015 | Coign et al. | |
| 2004/0047726 A1 | 3/2004 | Morrison | |
| 2009/0208322 A1 | 8/2009 | McCaffrey | |
| 2010/0111678 A1 | 5/2010 | Habarou et al. | |
| 2010/0150703 A1 | 6/2010 | Gonzalez et al. | |
| 2010/0232941 A1 | 9/2010 | Smoke et al. | |
| 2011/0052384 A1 | 3/2011 | Shi et al. | |
| 2011/0057394 A1 | 3/2011 | Halling | |
| 2011/0150635 A1 | 6/2011 | Motzkus et al. | |
| 2011/0274538 A1 | 11/2011 | Shi et al. | |
| 2012/0070276 A1 | 3/2012 | Shi et al. | |
| 2012/0107107 A1 | 5/2012 | Chan et al. | |
| 2012/0156029 A1 | 6/2012 | Karafillis et al. | |
| 2012/0177488 A1 | 7/2012 | Corman | |
| 2012/0247124 A1 | 10/2012 | Shapiro et al. | |
| 2012/0263582 A1 | 10/2012 | Foster et al. | |
| 2012/0301269 A1 | 11/2012 | Alvanos et al. | |
| 2012/0301312 A1 | 11/2012 | Berczik et al. | |
| 2012/0301303 A1 | 12/2012 | Alvanos et al. | |
| 2012/0308367 A1 | 12/2012 | Luczak | |
| 2013/0008176 A1 | 1/2013 | Shi et al. | |
| 2013/0011248 A1 | 1/2013 | Croteau et al. | |
| 2013/0177384 A1 | 7/2013 | Coign et al. | |
| 2013/0177411 A1 | 7/2013 | Weber et al. | |
| 2014/0202168 A1 | 7/2014 | Shapiro et al. | |
| 2014/0260320 A1 | 9/2014 | Graves et al. | |
| 2014/0271144 A1 | 9/2014 | Landwehr et al. | |
| 2015/0044044 A1 | 2/2015 | Sippel et al. | |
| 2016/0053624 A1* | 2/2016 | McCaffrey | F01D 11/22 415/173.1 |
| 2016/0123171 A1 | 5/2016 | Westphal et al. | |
| 2016/0177786 A1 | 6/2016 | Sippel et al. | |
| 2016/0208635 A1 | 7/2016 | Vetters et al. | |
| 2016/0222812 A1 | 8/2016 | Sippel et al. | |

FOREIGN PATENT DOCUMENTS

| | | |
|---|---|---|
| EP | 2589774 A1 | 5/2013 |
| EP | 2604805 A2 | 6/2013 |
| FR | 2580033 A1 | 10/1986 |
| FR | 2980235 B1 | 4/2015 |
| GB | 2235730 A | 3/1991 |
| GB | 2468768 A | 9/2010 |
| GB | 2480766 A | 11/2011 |
| JP | 09250304 A | 9/1997 |
| JP | 09264104 A | 10/1997 |
| WO | 2010058137 A1 | 5/2010 |
| WO | 2011157956 A1 | 12/2011 |
| WO | 2014120334 A1 | 8/2014 |
| WO | 2014143225 A1 | 9/2014 |
| WO | 2014163674 A1 | 10/2014 |

OTHER PUBLICATIONS

Blosser, Max L.; Thermal Stress in High Temperature Cylindrical Fasteners; NASA Technical Memorandum; May 1988; pp. 1-12.
Extended European Search Report, European Application No. 16152010.9-1610, dated Jun. 1, 2016, 5 pages.
European Office Action, European Application No. 16150210.9-1610, dated May 18, 2017, 4 pages.
U.S. Department of Energy Report No. DOE/CE/41000-3, entitled "Melt Infiltrated Ceramic Composites (Hipercomp) for Gas Turbine Engine Applications," by Gregory S. Corman and Krishan L. Luthra, dated Jan. 2006, 507 pages. [Reference submitted in multiple parts].

* cited by examiner

TURBINE SHROUD WITH TUBULAR RUNNER-LOCATING INSERTS

CROSS REFERENCE TO RELATED APPLICATIONS

This application claims priority to and the benefit of U.S. Provisional Patent Application No. 62/103,818, filed 15 Jan. 2015, the disclosure of which is now expressly incorporated herein by reference.

FIELD OF THE DISCLOSURE

The present disclosure relates generally to gas turbine engines, and more specifically to turbine shrouds used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, a fan assembly. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds positioned in the turbine may be exposed to high temperatures from products of the combustion reaction in the combustor. Such shrouds sometimes include components made from materials that have different coefficients of thermal expansion. Due to the differing coefficients of thermal expansion, the components of some turbine shrouds expand at different rates when exposed to combustion products. For example, coupling such components with traditional fasteners such as rivets or bolts may not allow for the differing levels of expansion and contraction during operation of the gas turbine engine.

SUMMARY

The present application discloses one or more of the features recited in the appended claims and/or the following features which, alone or in any combination, may comprise patentable subject matter.

A turbine shroud may include an annular metallic carrier and a blade track. The annular metallic carrier may be arranged around a central axis of the turbine shroud and formed to include a plurality of keyways extending in a radial direction into the annular metallic carrier. The blade track may include a ceramic annular runner and a plurality of ceramic inserts extending outward in a radial direction away from the ceramic annular runner. Each of the plurality of ceramic inserts may be tubular and may be arranged to extend into a corresponding one of the plurality of keyways formed in the annular metallic carrier to locate the blade track and the annular metallic carrier relative to the central axis while allowing radial growth of the annular metallic carrier and the blade track at different rates during use of the turbine shroud.

In some embodiments, the ceramic annular runner may include a forward section, an aft section spaced apart axially from the forward section, and a midsection extending between the forward section and the aft section. The ceramic inserts may extend outwardly from the midsection of the ceramic annular runner.

In some embodiments, the blade track may be formed to include a sensor passage. The sensor passage may extend radially through at least one of the ceramic inserts and the ceramic annular runner.

In some embodiments, the turbine shroud may further include a sensor coupled to the at least one ceramic insert for movement therewith. The sensor may extend radially inward through the sensor passage toward the ceramic annular runner. In some embodiments, the sensor may comprise a blade-tip probe.

In some embodiments, the annular metallic carrier may include a forward side and an aft side spaced apart axially from the forward side. Each keyway may open into the aft side and may extend axially toward the forward side.

In some embodiments, each insert may be formed to include an insert aperture that extends radially through the insert. In some embodiments, each insert may have a round shape when viewed radially inwardly from radially outward of the blade track.

According to another aspect of the present disclosure, a blade track may include a ceramic annular runner and a plurality of ceramic inserts. The ceramic annular runner may include an outer radial surface and an inner radial surface spaced apart radially from the outer radial surface. The plurality of ceramic inserts may be coupled with the ceramic annular runner for movement therewith and may extend radially outward away from the outer radial surface. Each insert may be tubular and form an insert aperture that extends radially through the insert.

In some embodiments, the ceramic annular runner may include a forward section, an aft section spaced apart axially from the forward section, and a midsection extending between the forward section and the aft section. The ceramic inserts may be located in the midsection of the ceramic annular runner.

In some embodiments, the ceramic annular runner may be formed to include a plurality of insert receivers. A portion of each ceramic insert may be positioned in a corresponding insert receiver.

In some embodiments, the insert receivers may extend in a radial direction partway through the ceramic annular runner from the outer radial surface toward the inner radial surface. In some embodiments, each ceramic insert may have a round shape when viewed from radially outward of the blade track.

In some embodiments, at least one ceramic insert may include an insert aperture extending therethrough. The ceramic annular runner may further include a runner aperture extending in a radial direction through the ceramic annular runner. The runner aperture may be aligned with the insert aperture to define a sensor passage that extends radially through the blade track.

In some embodiments, the blade track may further comprise a sensor coupled to a ceramic insert for movement therewith and the sensor extends radially through the sensor passage. In some embodiments, the sensor may comprise a blade-tip probe.

In some embodiments, the ceramic annular runner and the inserts may consist essentially of ceramic matrix composite material. In some embodiments, the ceramic annular runner and the inserts may consist essentially of silicon carbide containing matrix and silicon carbide containing reinforcements.

According to another aspect of the present disclosure, a method of assembling a turbine shroud may include a number of steps. The method may include providing a blade track including an annular runner and a plurality of tubular inserts coupled with the annular runner and extending radially outward away from the annular runner, rotating the annular runner to a predetermined orientation relative to a carrier so that keyways formed in the carrier are aligned with corresponding tubular inserts, and nesting the annular runner into the carrier so that the tubular inserts are received in the keyways to thereby establish a connection between the blade track and the carrier.

In some embodiments, the method may further include inserting a sensor through an insert aperture that extends radially through a tubular insert and into a runner aperture that extends radially through the annular runner.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
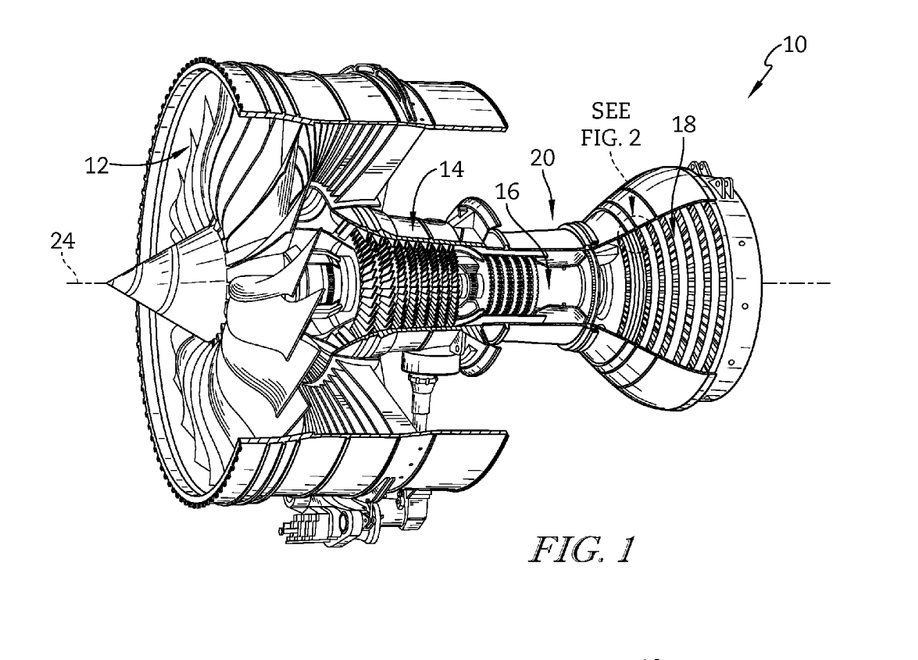
FIG. 1 is a cut-away perspective view of a gas turbine engine including a turbine section, the turbine section includes a rotating wheel assembly and a turbine shroud arranged around the rotating wheel assembly.

FIG. 1 is an illustrative aerospace gas turbine engine 10 cut-away to show that the engine 10 includes a fan assembly 12, a compressor 14, a combustor 16, and a turbine 18. The illustrative aerospace gas turbine engine 10 is used in aircraft. The fan assembly 12 pushes air through the engine 10 to propel the aircraft. The compressor 14 compresses and delivers air to the combustor 16. The combustor 16 mixes fuel with the compressed air received from the compressor 14 and ignites the fuel. The hot, high pressure products of the combustion reaction in the combustor 16 are directed into the turbine 18 and the turbine 18 extracts work to drive the compressor 14 and the fan assembly 12.

Figure 2:
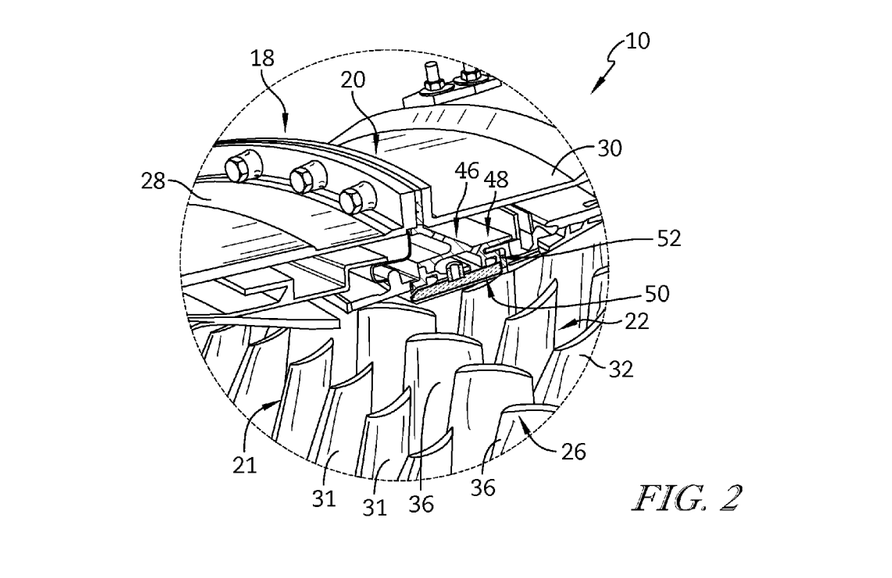
FIG. 2 is a detail view of FIG. 1 showing that the turbine shroud includes a carrier and a blade track positioned radially between the carrier and blades of the rotating wheel assembly to block combustion products from passing over the blades and further showing that the blade track includes an annular runner and a plurality of inserts coupled with the annular runner that extend into the carrier to locate the annular runner and carrier relative to a central axis of the turbine shroud.

The turbine 18 illustratively includes static turbine vane assemblies 21, 22, etc. and corresponding turbine wheel assemblies 26 etc. as shown in FIG. 2. Each vane assembly 21, 22, etc. includes a plurality of corresponding vanes 31, 32, etc. and each turbine wheel assembly 26 etc. includes a plurality of corresponding blades 36 etc. The vanes 31, 32, etc. of the vane assemblies 21, 22, etc. extend across the flow path of the hot, high-pressure combustion products from the combustor 16 to direct the combustion products toward the blades 36 etc. of the turbine wheel assemblies 26 etc. The blades 36 etc. are in turn pushed by the combustion products to cause the turbine wheel assemblies 26 etc. to rotate; thereby, driving the rotating components of the compressor 14 and the fan assembly 12.

The turbine 18 also includes a plurality of turbine shrouds 46 etc. that include a central axis 24 and the turbine shrouds 46 extend circumferentially about the central axis 24 as shown in FIGS. 1 and 2. The turbine shrouds 46 extend around each turbine wheel assembly 26 etc. to block combustion products from passing over the blades 36 without pushing the blades 36 to rotate. An exemplary first stage turbine shroud 46, shown in FIG. 2, extends around a first stage turbine wheel assembly 26 and is sized to block most combustion products from passing over the blades 36 without pushing the blades 36 to rotate. Combustion products that are allowed to pass over the blades 36 do not push the blades 36 and such passed-over products contribute to lost performance within the engine 10.

Figure 3:
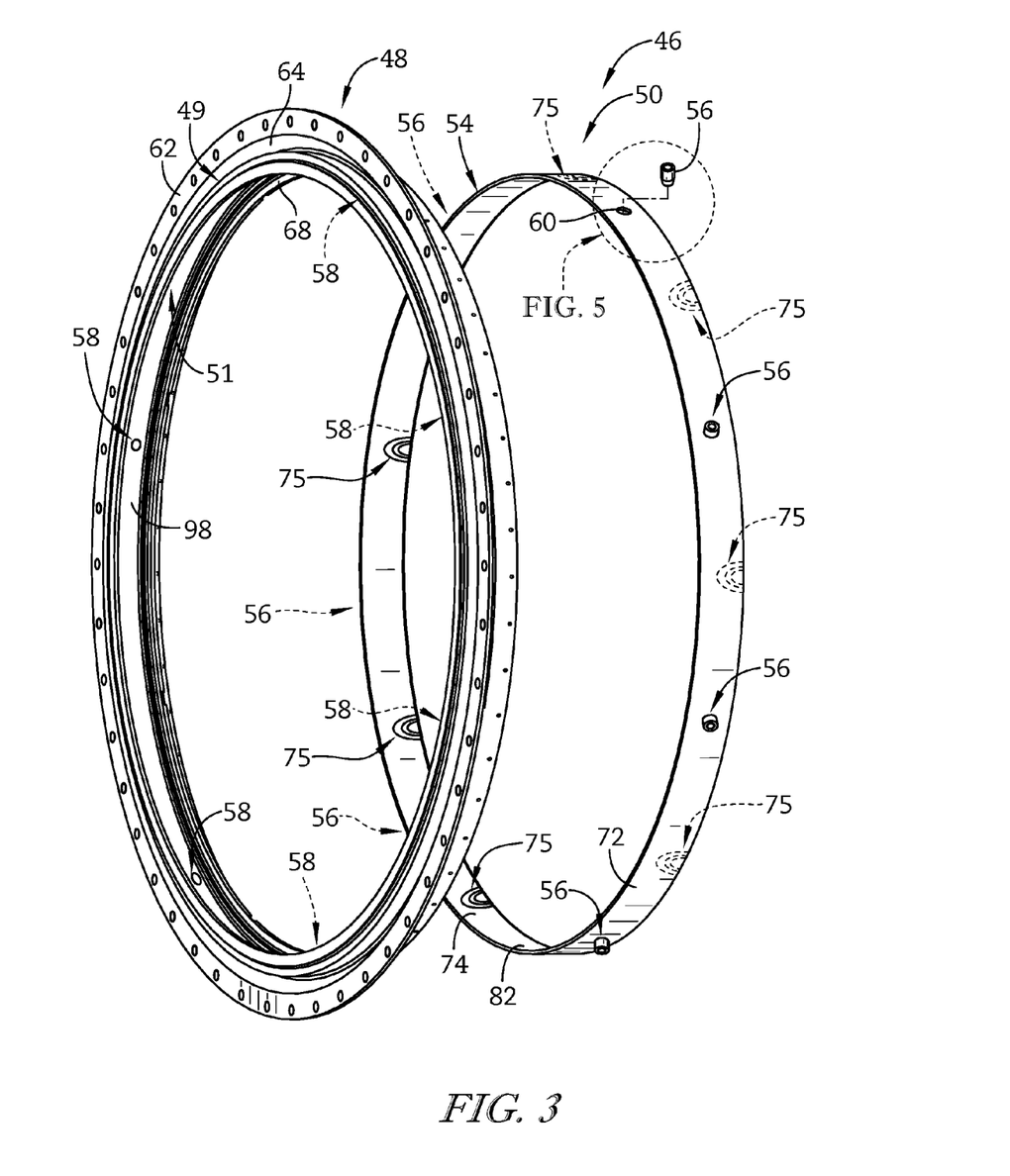
FIG. 3 is an exploded perspective view of the turbine shroud included in the gas turbine engine shown in FIGS. 1 and 2 showing that the turbine shroud includes the carrier formed to include a plurality of keyways adapted to receive the inserts of the blade track and the blade track including the plurality of inserts extending from an annular runner.
Figure 4:
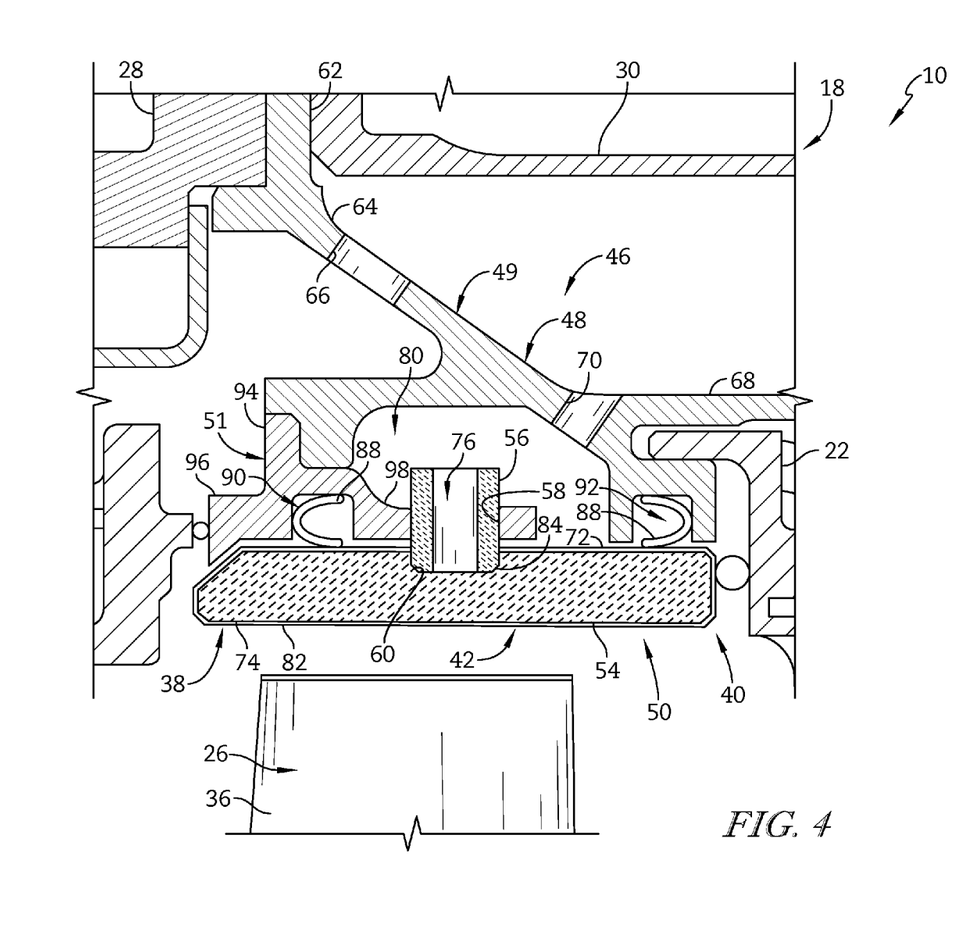
FIG. 4 is a partial cross-sectional view of the gas turbine engine of FIG. 1 showing that the inserts extend radially outward away from the annular runner into keyways formed in the carrier to locate the annular runner and carrier relative to the central axis.

The turbine shroud 46 illustratively includes a carrier 48 and a blade track (sometimes called seal ring) 50 as shown in FIGS. 2-4. The carrier 48 is an annular, round metallic component and is configured to support the blade track 50 in position adjacent the blades 36 of the turbine wheel assembly 26. The illustrative blade track 50 is an annular ceramic containing component and is nested into the carrier 48 along the central axis 24. A retainer 52 may engage the blade track 50 to position the blade track 50 relative to other static turbine components.

In the illustrative embodiments, tubular inserts 56 included in the blade track 50 extend into keyways 58 formed in the carrier 48 to couple the blade track 50 to the carrier 48 as show in FIGS. 2-4. The connection between the blade track 50 and the carrier 48 allows the blade track 50 and the carrier 48 to expand and contract at different rates during use in the engine 10 while keeping the blade track 50 and the carrier 48 centered on the central axis 24. In the illustrative embodiment, the connection also hold the blade track 50 in place circumferentially relative to the carrier 48. In some embodiments, the connection may hold the blade track 50 in place axially relative to the carrier 48. The tubular shape of the inserts 56 is designed to limit stresses included in the blade track 50 and allow for sensors to be inserted radially through the blade track 50 when desired.

The carrier 48 includes a carriage 49 and an intermediate support 51 as shown in FIGS. 3 and 4. The carriage 49 couples the turbine shroud 46 to a case 20 of the gas turbine engine 10. The intermediate support 51 is positioned radially between the carriage 49 and the annular runner 54 and couples the blade track 50 with the carrier 48. In some embodiments, the intermediate support 51 is omitted from the carrier 48 and, thus, the carrier 48 comprises the carriage 49. While the carrier 48 is illustrated as an annular (full-hoop) component, it may be made up of a number of segments in other embodiments.

The carriage 49 is illustratively formed to include a connection flange 62, a connector 64, and a support band 68 as shown in FIGS. 3 and 4. The connection flange 62 is coupled with the case 20 of the gas turbine engine 10. In the illustrative embodiment, the connection flange 62 is bolted between a combustor-case section 28 and a turbine-case section 30 included in the case 20. The connector 64 extends inwardly in the radial direction and rearwardly in an axial direction from the connection flange 62 to form a frusto-conical shape. The support band 68 extends inwardly in the radial direction from the connector 64 and the connection flange 62.

The support band 68 includes a forward side and an aft side spaced apart axially from the forward side along the central axis 24 as shown in FIG. 4. The support band 68 forms a radially-inward opening channel 80 positioned axially between the forward side and the aft side. The channel 80 faces the blade track 50 as shown in FIG. 4. Illustratively, the channel 80 is exposed to fluid communication with air radially outwardly of the blade track 50 via a vent hole pattern 70 formed in the support band 68 and a vent hole pattern 66 formed in the connector 64.

The intermediate support 51 includes a support flange 94, an intermediate band 96, and a support lip 98 as shown in FIG. 4. The support flange 94 extends radially outward away from the intermediate band 96 and is coupled with the carriage 49. The intermediate band 96 is illustratively formed to include an inwardly-opening forward chamber 90 that receives a seal 88. The support lip 98 extends axially away from the intermediate band 96 toward the aft end of the support band 68. Illustratively, the support lip 98 is positioned in the channel 80.

The support lip 98 is formed to include a plurality of keyways 58 as shown in FIGS. 3 and 4. The keyways 58 are spaced apart from one another circumferentially to form a keyway pattern around the circumference of the intermediate support 51. The keyways 58 extend through the support lip 98 in the radial direction and open into the channel 80. Each keyway 58 is sized to receive an insert 56 that extends through the keyway 58 to block movement of the blade track 50 relative to the carrier 48.

In the illustrative embodiment, the blade track 50 includes an annular runner 54 and the plurality of inserts 56 as shown in FIG. 3. The annular runner 54 is arranged to extend around the blades 36 to block combustion products from passing over the blades 36. The inserts 56 extend radially away from the annular runner into the keyways 58 formed in the intermediate support 51 of the carrier 48 to keep the blade track 50 centered with the carrier 48 relative to the central axis 24 while allowing for relative thermal growth between the blade track 50 and the carrier 48 as shown in FIG. 4. The connection formed between the blade track 50 and the carrier 48 allows the blade track 50 and carrier 48 to grow and contract at different rates. In the illustrative embodiment, the blade track 50 comprises at least three inserts 56. In the illustrative embodiment, the blade track 50 may be translated axially relative to the carrier 48 to cause the inserts 56 to be received in the keyways 58 formed in the intermediate support 51.

Figures 5, 6:
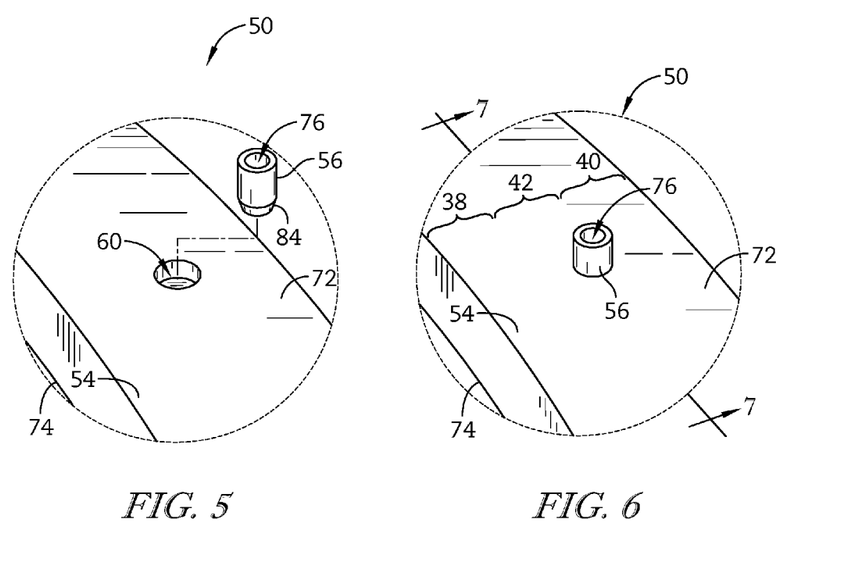
FIG. 5 is a detail perspective view of the blade track included in the turbine shroud of FIGS. 3 and 4 showing that the blade track includes the annular runner and a n insert and suggesting that a portion of the insert is received in the annular runner to couple the insert to the annular runner.
FIG. 6 is a detail perspective view of the blade track shown in FIG. 5 with the insert coupled with the annular runner.

The annular runner 54 includes a forward section 38, an aft section 40 spaced apart axially from the forward section 38 relative to the central axis 24, and a midsection 42 positioned axially between the forward section 38 and the aft section 40 as shown in FIGS. 5 and 6. In the illustrative embodiment, each of the sections 38, 40, 42 make up about one-third of the axial thickness of the annular runner 54. The forward section 38 is positioned toward the compressor 14 and the aft section 40 is positioned toward the turbine 18. The inserts 56 are located in the midsection 42 as shown in FIG. 5. During use of the annular runner 54 in the engine 10, the midsection 42 is often in compression and the forward and aft sections 38, 40 are often in tension, when considering the hoop direction of the annular runner 54.

The location of the inserts 56 in the annular runner 54 influence the thermal stresses in the annular runner 54 produced around the inserts 56. In the illustrative embodiment, the blade track 50 is used in the turbine 18. The components such as, for example, the turbine shroud 46 in the turbine 18 experience high temperatures during operation. As a result, the turbine shroud 46 may be cooled with air to increase its useful life. Illustratively, high-pressure cooling air is supplied to an outer radial surface 72 of the blade track 50 to purge the channel 80. As a result of the cooling air, the forward section 38 and the aft section 40 of the annular runner 54 are cooler than the midsection 42.

In some embodiments, the blade track 50 further includes an abradable layer 82 coupled to the inner radial surface 74. The abradable layer 82 may be thinner about the midsection 42 due to rubbing of the blades 36 against the abradable layer 82 about the midsection 42. As a result, the forward and aft sections 38, 40 may be cooler than the midsection 42 of the annular runner 54 due to the combustion products in the turbine 18 and the relatively thin region of the abradable layer 82.

Because the forward and aft sections 38, 40 may be cooler than the midsection 42, the peak thermal stresses in the annular runner 54 may be located at the forward and aft sections 38, 40. However, the peak mechanical stresses may be located in the midsection 42 due to the inserts 56 being formed in the midsection 42. As a result, locating the inserts 56 in the midsection 42 may separate the peak mechanical stresses from the peak thermal stresses of the annular runner 54. In some embodiments, the inserts 56 are located about midway circumferentially between hot streaks 75 developed by spaced apart fuel nozzles included in the engine 10 to further reduce the temperatures experienced by the inserts 56. The hot streaks 75 may be located directly axially aft of corresponding fuel nozzles or they may be circumferentially off set from the fuel nozzles due to swirl induced in the combustor 16.

In the illustrative embodiment, the annular runner 54 is formed to include a plurality of insert receivers 60 spaced apart circumferentially and sized to receive the plurality of inserts 56 as shown in FIGS. 3-7. The inserts 56 are positioned in the insert receivers 60 and coupled with the annular runner 54 as suggested in FIGS. 5-7. The inserts 56 may be coupled to the annular runner 54 by a braze coprocessing or any other suitable coupling.

Figure 7:
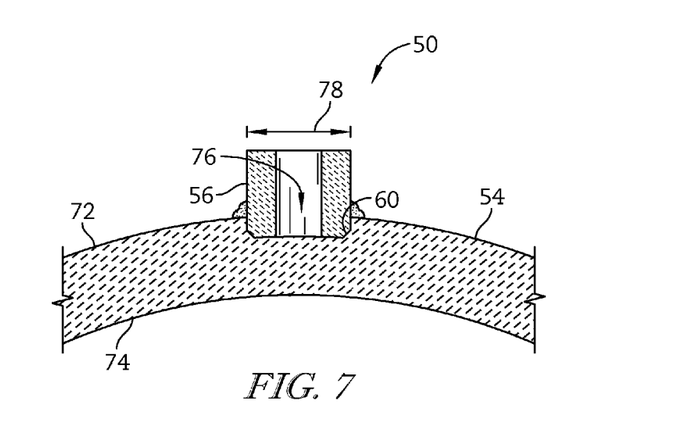
FIG. 7 is a cross-sectional view of the blade track of FIG. 6 showing that the insert extends into the annular runner and is coupled with the annular runner by a braze layer.

The annular runner 54 includes an outer radial surface 72 and an inner radial surface 74 positioned radially between the central axis 24 and the outer radial surface 72 as shown in FIGS. 4 and 7. The illustrative insert receivers 60 extend in a radial direction partway through the annular runner 54 from the outer radial surface 72 toward the inner radial surface 74 of the annular runner 54. The inserts 56 are positioned in the insert receivers 60 and extend radially outward away from the outer radial surface 72. In the illustrative embodiment, the inserts 56 include chamfered surfaces 84 as shown in FIGS. 4 and 7. Illustratively, the chamfered surfaces 84 are smaller than a depth of the insert receivers 60 to allow some cylindrical to cylindrical surface contact.

The illustrative inserts 56 are tubular and are formed to include an insert aperture 76 as shown in FIG. 4. The insert apertures 76 may cause the inserts 56 to have a reduced weight compared to inserts without insert apertures 76. The inserts 56 may be easier to produce because of the reduced section thickness and/or by allowing braided tube preforms to be used. An insert with reduced thickness may include more consistent material properties. In the illustrative embodiment, the insert apertures 76 extend radially through the inserts 56.

The inserts 56 are illustratively round and have a diameter 78 as shown in FIG. 7. The shape and diameter 78 of the inserts 56 may reduce stresses in the annular runner 54 for example, bending stresses. The shape and diameter 78 of the inserts 56 also may reduce contact stress between the insert 56 and the annular runner 54. The shape and diameter 78 of the inserts 56 may allow for a large insert aperture 76 and increases stiffness and strength of the insert 56. In some embodiments, the diameter 78 is in a range of about a quarter of an inch to about half of an inch. In the illustrative embodiment, the diameter 78 is greater than about three-eighths of an inch. In some embodiments, the annular runner 54 has a width of about one inch to about two inches.

In the illustrative embodiment, the inserts 56 and the insert receivers 60 are circular when viewed looking radially inwardly toward the central axis 24. In other embodiments, each insert 56 and insert receiver 60 may be rectangular or may have another shape when viewed in the radial direction. When viewed in the radial or axial directions, sides of each insert 56 are perpendicular to a centerline of the annular runner 54.

The annular runner 54 is illustratively made from a ceramic material; and, more particularly, a ceramic matrix composite (CMC) including silicon carbide reinforcements and silicon carbide matrix. For purposes of this application, a ceramic material is any monolithic ceramic or composite in which at least one constituent is a ceramic. In other embodiments, the annular runner 54 may be made of other metallic, non-metallic, or composite materials with low coefficients of thermal expansion.

The annular runner 54 has a relatively low coefficient of thermal expansion because of its composition. The annular runner 54 is illustratively a unitary component forming a full hoop as shown in FIG. 3. The annular runner 54 is a component of one-piece, continuous construction, rather than as a series of joined segments. This integral construction eliminates gaps that may be formed between parts of a multi-piece (or segmented) runner. The one-piece full hoop of the annular runner 54 encourages uniform radial expansion of the blade track 50 at high temperatures. Uniform radial expansion of the blade track 50 allows the blade track 50 to remain round at high temperatures which results in the ability to further maintain a small gap between the blades 36 and the blade track 50 while hot combustion products are being directed over the blades 36 and the blade track 50.

Similarly, in the illustrative embodiment, each insert 56 is made from a ceramic material; and, more particularly, a ceramic matrix composite (CMC) including silicon carbide reinforcements and silicon carbide matrix. In other embodiments, each insert 56 may be made from monolithic silicon carbide, dense chopped fiber reinforced silicon carbide, monolithic silicon nitride based materials, monolithic aluminum oxide, whisker reinforced aluminum oxide, and/or MAX phase materials (e.g. $Ti_3SIC_2$, $Ti_2AlC$, etc.).

In other embodiments, the inserts 56 may comprise silicon-carbide reinforcements suspended in a silicon-carbide containing matrix material. In other embodiments, the insert 56 may comprise oxide-oxide reinforcements suspended in an oxide-oxide containing matrix material. In still other embodiments, each insert 56 may be made of other metallic, non-metallic, or composite materials with low coefficients of thermal expansion that are compatible with both the carrier 48 and the annular runner 54.

In the illustrative embodiment, the inserts 56 are bonded to the carrier 48 via brazing as shown in FIG. 7. In other embodiments, the inserts 56 may be welded to the annular runner 54 creating a weld between the inserts 56 and the annular runner 54. Filler materials may be used to form the welds and such filler materials may include silicon, a transition metal silicide, and/or a MAX phase material.

In other embodiments, instead of bonding the inserts 56 to the annular runner 54 using a braze layer, the inserts 56 may be integrally woven into a preform that is later coprocessed to create the annular runner 54 so that the inserts 56 are bonded to the annular runner 54. In some such embodiments, the inserts 56 are machined after coprocessing of the annular runner 54 so that the inserts 56 have a predetermined shape/orientation relative to the geometry of the annular runner 54.

In the illustrative embodiment, the turbine shroud 46 further includes seals 88 as shown in FIG. 4. The seals 88 are positioned between the carrier 48 and the annular runner 54 to block combustion products from flowing over the outer radial surface 72 of the annular runner 54. The seals 88 are arranged to maintain contact with the annular runner 54 when the carrier 48 and annular runner 54 move radially due to thermal expansion. In some embodiments, the seals 88 are pre-loaded into a compressed state.

The intermediate support 51 is formed to include an inwardly-opening forward chamber 90 and the carriage 49 is formed to include an inwardly-opening aft chamber 92 as shown in FIG. 4. The forward chamber 90 is axially aligned with the forward section 38 of the annular runner 54 and receives a first seal 88. The aft chamber 92 is aligned with the aft section 40 of the annular runner 54 and receives a second seal 88. The annular runner 54 is located radially inward of the forward and aft chambers 90, 92 and engages the seals 88 to maintain the seals 88 in the chambers 90, 92. In the illustrative embodiment, seals 88 comprise C-shaped hoops as shown in FIG. 4.

According to at least one method of assembling the turbine shroud 46, a user rotates the annular runner 54 to a predetermined orientation relative to the carrier 48 so that the inserts 56 are aligned with the corresponding keyways 58. Then the user nests the annular runner 54 into the carrier 48 so that the annular runner 54 is concentric with the carrier 48 to thereby establish the connection between the blade track 50 and the carrier 48. A sensor 291 may then be inserted through an insert aperture 76 that extends radially through a tubular insert 56 and into a runner aperture 286 that extends radially through the annular runner 54.

Another illustrative blade track 150 is shown in FIGS. 8-11. The blade track 150 is configured for use in the turbine shroud 46 and is substantially similar to the blade track 50 shown in FIGS. 1-7 and described herein. Accordingly, similar reference numbers in the 100 series indicate features that are common between the blade track 50 and the blade track 150. The description of the blade track 50 is hereby incorporated by reference to apply to the blade track 150, except in instances when it conflicts with the specific description and drawings of the blade track 150.

Figure 8:
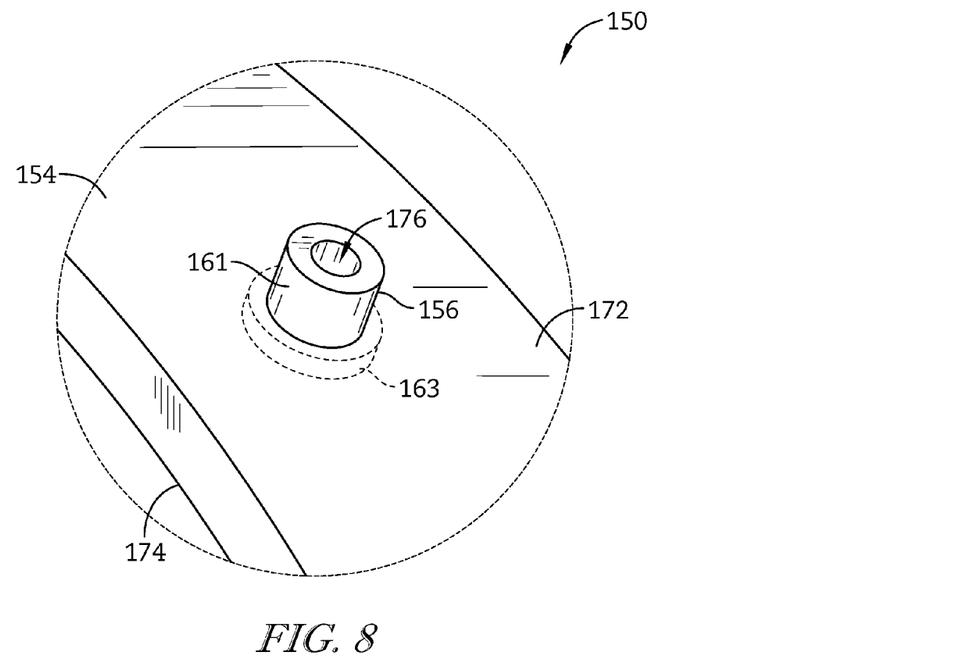
FIG. 8 is a detail perspective view of another blade track adapted for use in the turbine shroud of FIGS. 3 and 4 showing that the blade track includes an annular runner and an insert that is integrally formed with the annular runner.
Figure 9:
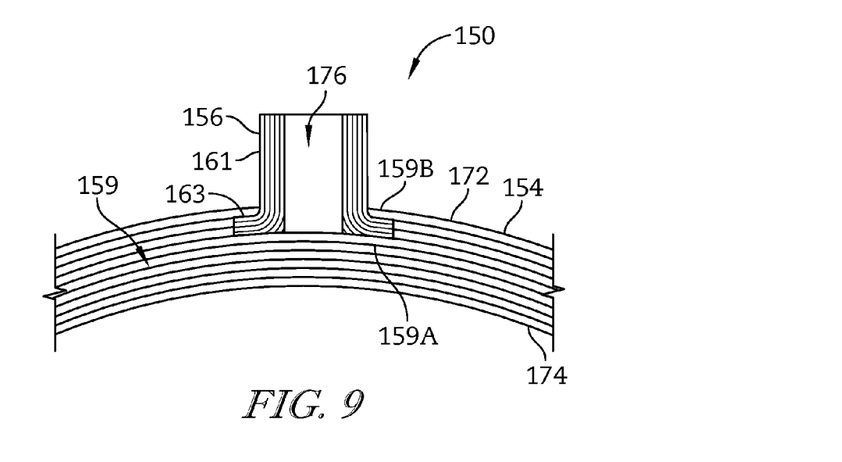
FIG. 9 is a cross-sectional view of the blade track of FIG. 8 showing that the annular runner and the inserts comprise overlapping woven plies of reinforcement material to form an integral blade track.

The blade track 150 includes an annular runner 154 and a plurality of inserts 156 as shown in FIGS. 8 and 9. Instead of bonding the inserts 156 to the annular runner 154 using a braze layer, the inserts 156 are integrally woven into a preform that is later coprocessed to create the annular runner 154 so that the inserts 156 are bonded with the annular runner 154.

The inserts 156 include an upper key portion 161 and a lower shoulder portion 163 as shown in FIG. 9. The upper key portion 161 extends radially outward away from the outer radial surface 172 of the annular runner 154 as shown in FIG. 8. The lower shoulder portion 163 is coupled with the upper key portion 161 and extends outward away from the upper key portion 161 to form a flared shoulder. The outer radial surface 172 of the annular runner 154 overlaps the lower shoulder portion 163 to couple the lower shoulder portion 163 with the annular runner 154 radially between the outer radial surface 172 and the inner radial surface 174.

In the illustrative embodiment, the inserts 156 and the annular runner 154 comprise ceramic materials. The lower shoulder portion 163 of the inserts 156 are integrally woven into a preform 159 that is later coprocessed to create the annular runner 154 so that the inserts 156 are bonded with the annular runner 154 as shown in FIG. 9. In some embodiments, the lower shoulder portion 163 is circular and continuous as shown in FIG. 8.

Figure 10:
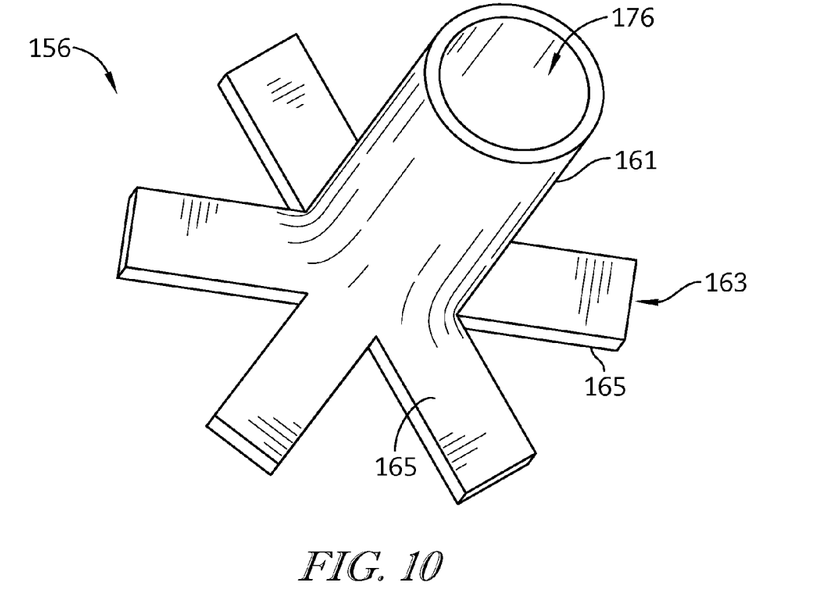
FIG. 10 is a perspective view of another insert for use in the blade track of FIGS. 8 and 9 showing that a tubular preform is cut and deformed to form the insert that comprises an upper tube portion and a plurality of legs extending outwardly away from the upper tube portion to form a lower shoulder portion.
Figure 11:
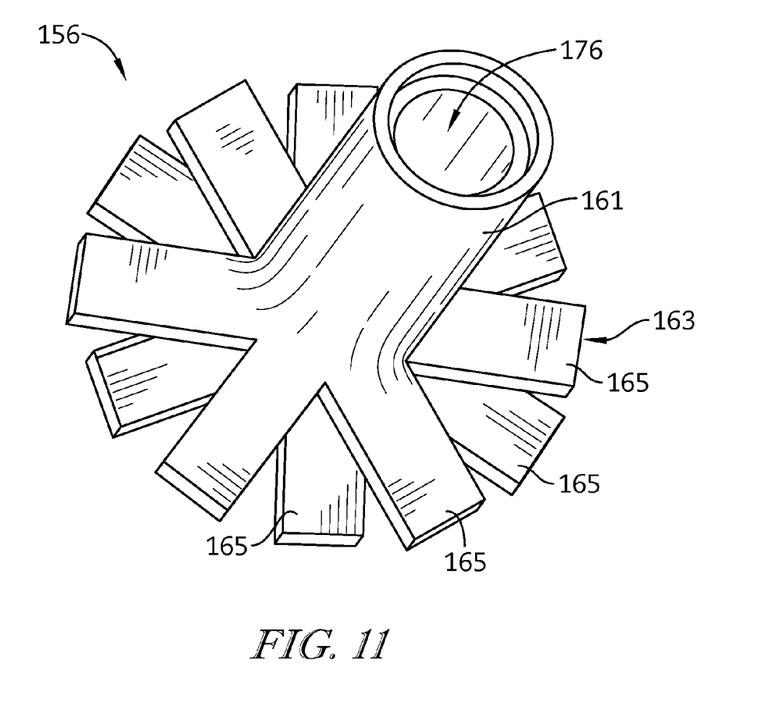
FIG. 11 is a perspective view of another insert for use in the blade track of FIGS. 8 and 9 showing that a number of nested tubular insert preforms are cut and deformed to form an insert that comprises an upper tube portion and a plurality of legs extending outwardly away from the upper tube portion to form a lower shoulder portion.

In other embodiments, the lower shoulder portion 163 includes a plurality of legs 165 as shown in FIGS. 10 and 11. In one illustrative embodiment, the legs 165 extend outwardly away from the upper key portion 161. In the illustrative embodiment, the upper key portion 161 and the legs 165 are integrally formed as shown in FIG. 10. In other embodiments, insert 156 comprises a number of components.

According to at least one method of forming the blade track 150, several axial cuts are made along a longitudinal axis of a tubular insert preform as shown in FIGS. 10. The tubular insert preform may be made from a woven or braided reinforcement such that no seam extends along the preform. The cut portions are spread radially apart from the uncut portion to form an upper key portion preform and a lower shoulder portion preform having a number of legs. The lower shoulder portion preform is positioned on a first plurality of annular runner preform layers 159A. A second plurality of annular runner preform layers 159B are placed over the lower shoulder portion preform to form a blade track preform. Ceramic matrix material is applied to the blade track preform and the blade track preform is coprocessed to form the blade track 150.

According to at least another method of forming the blade track 150, several axial cuts are made along a longitudinal axis of a first tubular insert preform as shown in FIG. 11. The cut portions are spread radially apart from the uncut portion to form a first upper key portion preform and a first lower shoulder portion preform having a number of legs. Several axial cuts are made along a longitudinal axis of a second tubular insert preform. The cut portions are spread radially apart from the uncut portion to form a second upper key portion preform and a second lower shoulder portion preform having a number of legs.

The second upper key portion of the second insert preform is inserted into the first upper key portion. The first lower shoulder portion is rotated to cause the legs of the first lower shoulder portion be misaligned with the legs of the second lower shoulder portion as shown in FIG. 11 to form an insert assembly preform. The first and second lower shoulder portion preforms are positioned on a first plurality of annular runner preform layers 159A. A second plurality of annular runner preform layers 159B are placed over the lower shoulder portion preforms to form a blade track preform. Ceramic matrix material is applied to the blade track preform and the blade track preform is coprocessed to form the blade track 150.

Figure 12:
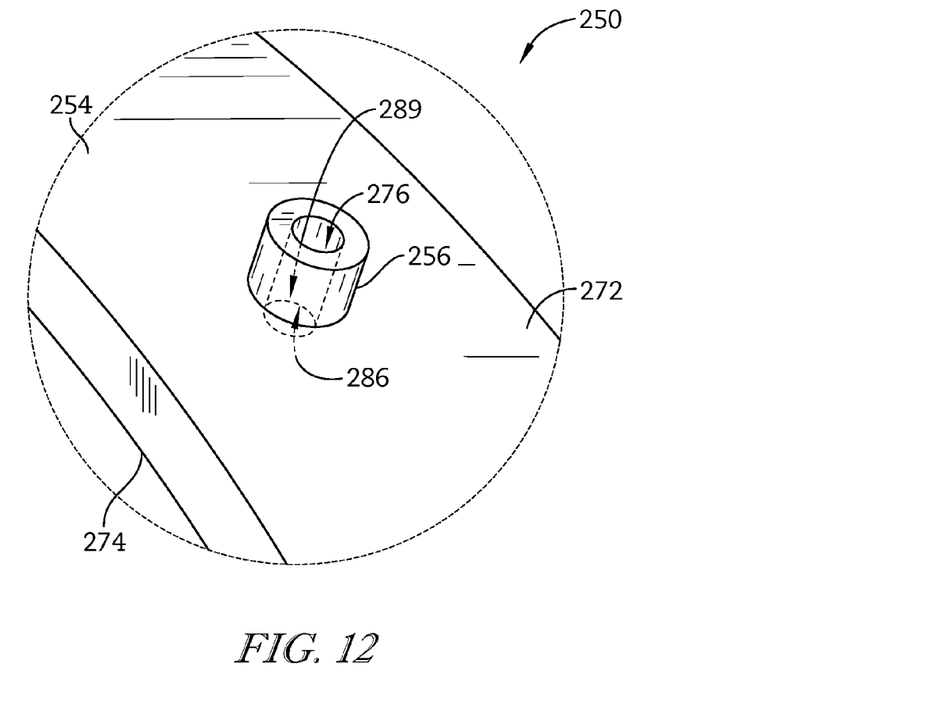
FIG. 12 is a detail perspective view of another blade track for use in the turbine shroud of FIGS. 3 and 4 showing that the blade track includes the annular runner and an insert having an insert aperture and that the annular runner is formed to include a runner aperture aligned with the insert aperture to form a sensor passage extending through the blade track.
Figure 13:
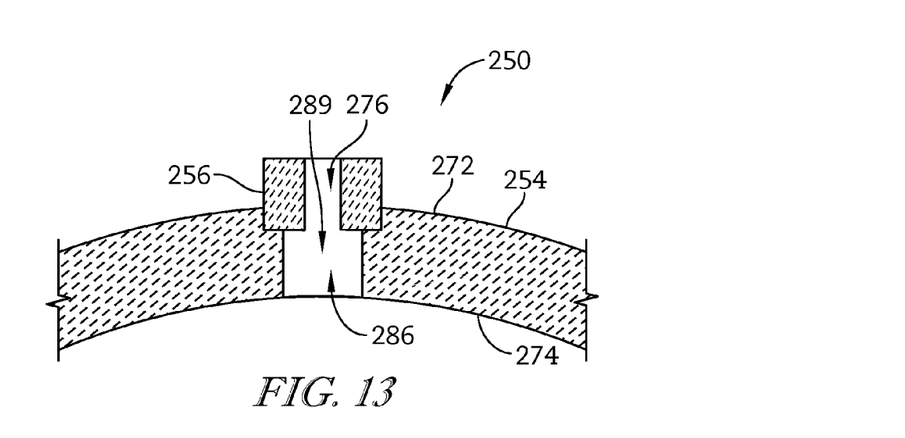
FIG. 13 is a cross-sectional view of the blade track of FIG. 12 showing that the sensor passage extends through the insert and the annular runner.
Figure 14:
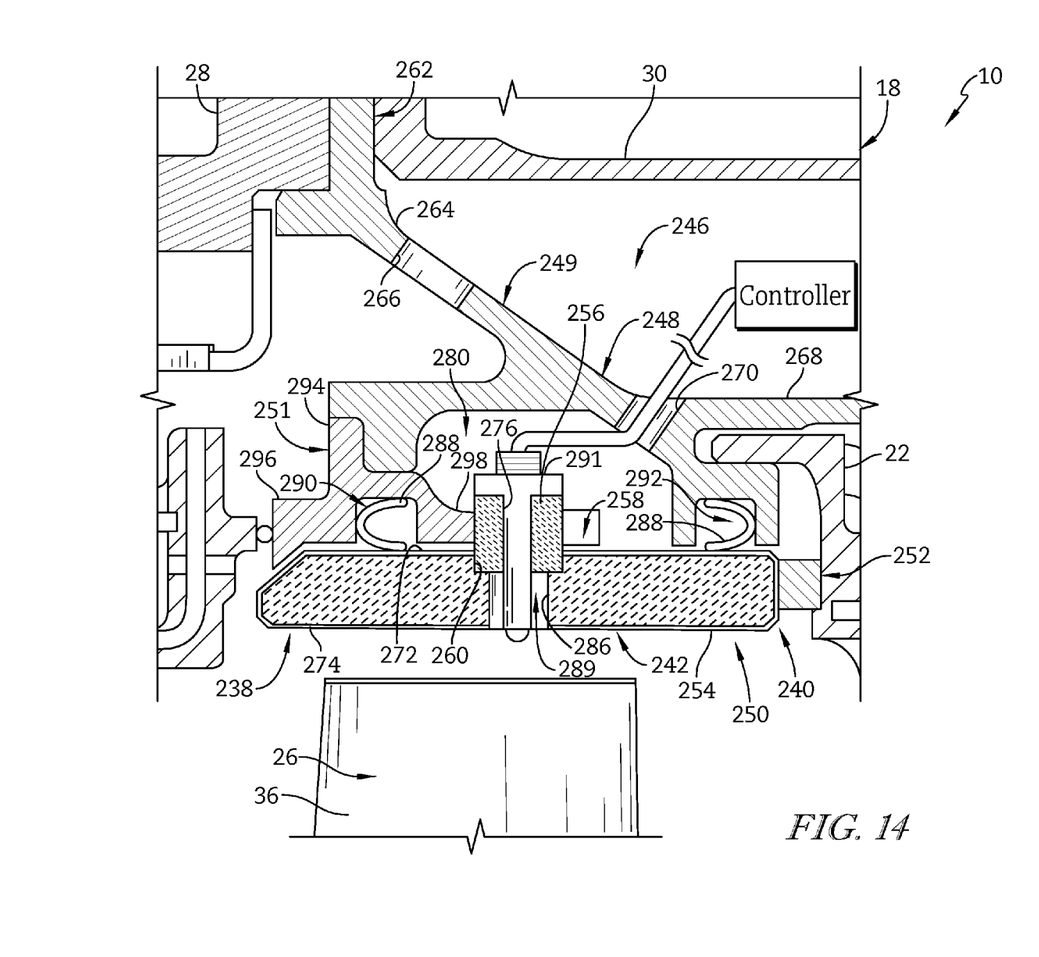
FIG. 14 is a partial cross-sectional view of the blade track of FIG. 12 in the gas turbine engine of FIG. 1 showing that the inserts extend radially outward away from the annular runner into a slot formed in the carrier and a blade-tip probe extends through the sensor passage formed in the blade track to detect and measure the distance between the blade-tip probe and the blades of the rotating wheel assembly.

Another illustrative blade track 250 is shown in FIGS. 12-14. The blade track 250 is configured for use in the turbine shroud 46 and is substantially similar to the blade track 50 shown in FIGS. 1-7 and described herein. Accordingly, similar reference numbers in the 200 series indicate features that are common between the blade track 50 and the blade track 250. The description of the blade track 50 is hereby incorporated by reference to apply to the blade track 250, except in instances when it conflicts with the specific description and drawings of the blade track 250.

The blade track 250 includes an annular runner 254 and the inserts 256 as shown in FIGS. 12-14. The annular runner 254 includes a runner aperture 286 that extends in a radial direction partway through the annular runner 254 from the inner radial surface 274 toward the outer radial surface 272 as shown in FIG. 13. The runner aperture 286 is in fluid communication with one of the insert apertures 276 to define a sensor passage 289 that extends radially through the blade track 250.

In the illustrative embodiment, the insert receiver 260 and the runner aperture 286 form a counter bore as shown in FIGS. 13 and 14. The insert receiver 260 has a diameter that is larger than a diameter of the runner aperture 286. The runner aperture 286 has a diameter that is larger than a diameter of the insert aperture 276.

In some embodiments, the sensor passage 289 has an axial width that is between about 15% and about 50% of the axial width of the annular runner 254. In some embodiments, the sensor passage 289 has an axial width that is between about 15% and about 25% of the axial width of the annular runner 254.

The blade track 250 further includes a sensor 291 coupled to the insert 256 for movement therewith as shown in FIG. 14. The sensor 291 extends radially inward through the sensor passage 289 toward the inner radial surface 274. In some embodiments, the sensor 291 extends beyond the inner radial surface 274. In the illustrative embodiment, the sensor 291 comprises a blade-tip probe 291. The blade-tip probe 291 is spaced apart radially from the turbine wheel assembly 26 and adapted to determine a distance between the blades 36 and the inner radial surface 274 of the annular runner 254. In other embodiments, the sensor 291 is coupled with the carrier 246 and extends through the carrier 246, as an example, through a vent hole 270.

Unlike segmented blade tracks, there are no inherent breaks in a full hoop blade track such as, for example, blade track 250 to potentially provide a sensor 291 access to the blades 36. The sensor passage 289 formed through the insert features of the blade track 250 provides access to the blades 36 for the sensor 291. Additionally, the sensor 291 experiences relatively little movement because the inserts 256 block relative movement between the blade track 250 and the carrier 48. As such, the sensor 291 can maintain alignment with the sensor passage 289 throughout the engine operating ranges and throughout a range of thermal growth between the carrier 246 and the blade track 250. In some embodiments, the inserts 256 align the blade track 250, the carrier 248, and the outer case 220 with each other to allow the sensor 291 to be mounted to the outer case 220 outside of the engine 10.

In the illustrative embodiment, the sensor 291 is connected to a controller as shown in FIG. 14. The controller is adapted to adjust engine conditions to vary the distance between the blades and the inner radial surface 274 to adjust the efficiency of the engine 10 based on the signals received from the sensor 291. In other embodiments, the sensor 291 comprises a tip-timing probe adapted to measure the speed of the turbine wheel assembly 26. The controller is adapted to determine if the blades are having a dynamic response which may lead to high cycle fatigue. The controller may be adapted to adjust engine conditions to reduce or eliminate the dynamic response.

In the illustrative embodiment, the intermediate support 251 includes a forward side and an aft side spaced apart axially from the forward end. The keyways 258 comprise keyway slots 258 and each keyway slot 258 opens into the aft side of the intermediate support 251 and extends axially toward the forward side. As shown in FIG. 14, the keyway slots 258 open into the support lip 298 and extend partway into the support lip 298 toward the forward side.

Illustratively, the blade track 250 further includes a retainer 252 as shown in FIG. 14. The retainer 252 is an annular metallic ring with a linear cross section. The retainer 252 engages the aft side of the blade track 250 to locate the blade track 250 relative to the second stage vane assembly 22. In other embodiments, the retainer 252 may be a non-metallic or ceramic component.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud comprising
an annular metallic carrier arranged around a central axis of the turbine shroud and formed to include a plurality of keyways extending in a radial direction into the annular metallic carrier, and
a blade track including a ceramic annular runner and a plurality of ceramic inserts extending outward in a radial direction away from the ceramic annular runner, wherein each of the plurality of ceramic inserts are tubular and are arranged to extend into a corresponding one of the plurality of keyways formed in the annular metallic carrier to locate the blade track and the annular metallic carrier relative to the central axis while allowing radial growth of the annular metallic carrier and the blade track at different rates during use of the turbine shroud.

2. The turbine shroud of claim 1, wherein the ceramic annular runner includes a forward section, an aft section spaced apart axially from the forward section, and a midsection extending between the forward section and the aft section and the ceramic inserts extend outwardly from the midsection of the ceramic annular runner.

3. The turbine shroud of claim 1, wherein the blade track is formed to include a sensor passage extending radially through at least one of the ceramic inserts and the ceramic annular runner.

4. The turbine shroud of claim 3, further comprising a sensor coupled to the at least one ceramic insert for movement therewith and the sensor extends radially inward through the sensor passage toward the ceramic annular runner.

5. The turbine shroud of claim 4, wherein the sensor comprises a blade-tip probe.

6. The turbine shroud of claim 1, wherein the annular metallic carrier includes a forward side and an aft side spaced apart axially from the forward side and each keyway opens into the aft side and extends axially toward the forward side.

7. The turbine shroud of claim 1, wherein each insert is formed to include an insert aperture extending radially through the insert.

8. The turbine shroud of claim 1, wherein each insert has a round shape when viewed radially inwardly from radially outward of the blade track.

9. A blade track comprising
a ceramic annular runner including an outer radial surface and an inner radial surface spaced apart radially from the outer radial surface, and
a plurality of ceramic inserts coupled with the ceramic annular runner for movement therewith and extending radially outward away from the outer radial surface, wherein each insert is tubular and forms an insert aperture that extends radially through the insert.

10. The blade track of claim 9, wherein the ceramic annular runner includes a forward section, an aft section spaced apart axially from the forward section, and a midsection extending between the forward section and the aft section and the ceramic inserts are located in the midsection of the ceramic annular runner.

11. The blade track of claim 9, wherein the ceramic annular runner is formed to include a plurality of insert receivers and a portion of each ceramic insert is positioned in a corresponding insert receiver.

12. The blade track of claim 11, wherein the insert receivers extend in a radial direction partway through the ceramic annular runner from the outer radial surface toward the inner radial surface.

13. The blade track of claim 9, wherein each ceramic insert has a round shape when viewed from radially outward of the blade track.

14. The blade track of claim 13, wherein at least one ceramic insert includes an insert aperture extending therethrough, the ceramic annular runner further includes a runner aperture extending in a radial direction through the ceramic annular runner, and the runner aperture is aligned with the insert aperture to define a sensor passage that extends radially through the blade track.

15. The blade track of claim 14, further comprising a sensor coupled to a ceramic insert for movement therewith and the sensor extends radially through the sensor passage.

16. The blade track of claim 15, wherein the sensor comprises a blade-tip probe.

17. The blade track of claim 9, wherein the ceramic annular runner and the inserts consist essentially of ceramic matrix composite material.

18. The blade track of claim 9, wherein the ceramic annular runner and the inserts consist essentially of silicon carbide containing matrix and silicon carbide containing reinforcements.

19. A method of assembling a turbine shroud comprising providing a blade track including an annular runner and a plurality of tubular inserts coupled with the annular runner and extending radially outward away from the annular runner, rotating the annular runner to a predetermined orientation relative to a carrier so that keyways formed in the carrier are aligned with corresponding tubular inserts, and nesting the annular runner into the carrier so that the tubular inserts are received in the keyways to thereby establish a connection between the blade track and the carrier.

20. The method of claim 19, further comprising inserting a sensor through an insert aperture that extends radially through a tubular insert and into a runner aperture that extends radially through the annular runner.

* * * * *